April 28, 1970   D. H. BALTZER   3,508,810
PHOTOCHROMIC SYSTEMS
Filed July 19, 1967

INVENTOR/S

DONALD H. BALTZER

BY *Melville, Strasser, Foster and Hoffman*
ATTORNEYS

United States Patent Office 3,508,810
Patented Apr. 28, 1970

3,508,810
PHOTOCHROMIC SYSTEMS
Donald H. Baltzer, Cincinnati, Ohio, assignor to Vari-Light Corporation, Cincinnati, Ohio, a corporation of Ohio
Filed July 19, 1967, Ser. No. 654,634
Int. Cl. G02f 1/28; E05f 17/26
U.S. Cl. 350—160
10 Claims

ABSTRACT OF THE DISCLOSURE

The provision of normally unstable photochromic substances which are subject to rapid deterioration in systems wherein their useful life is greatly enhanced while at the same time enhancing their photochromic response, the substances comprising mercury dithizonate or a spiropyran incorporated in a resinous vehicle, such as polyvinyl butyral resin, sealed between protective surfaces, such as glass plates.

BACKGROUND OF THE INVENTION

Photochromic substances undergo a spontaneous reversible change of color upon exposure to electromagnetic radiation. For example, a photochromic substance which is transparent and normally colorless will, upon irradiation, turn dark, the degree of darkening being dependent upon the particular substance employed and the degree of irradiation. The basis of photochromic reaction lies in the fact that photochromic substances contain bi-stable atoms or molecules which are capable of changing back and forth between two distinct states. These different states may be the result of different atomic, molecular, or electronic configurations and are induced by absorbed radiant energy which brings about a change in the ability of the substances to absorb light.

There are many known classifications of photochromic compounds which exhibit a variety of performance characteristics. This permits a wide latitude in the selection of a photochromic material for a specific application. However, the difficulty with most of the known photochromic material is that they have an extremely limited useful life. This is especially true of the organic photochromic chemicals since they are particularly prone to breakdown. While there are a limited number of inorganic compounds which are resistant to breakdown upon cycling or upon continued exposure, these resistant compounds are much too slow in performance to be satisfactory for many of the photochromic applications, such as in the provision of light filters which are instantaneously responsive to exposure to light. Consequently, to date very little practical use has been made of the photochromic materials even though their properties have been sufficiently understood to predict useful applications.

SUMMARY OF THE INVENTION

Photochromic substances usually require a media of particular characteristics for optimum performance. Some substances will perform only as solids and others only as solutions in other media, the dissolving substance being required to have characteristics which are conducive to the phototropic reaction of the photochromic material. The instant invention pertains primarily to those photochromic substances which require that they be dissolved in a solution which is inert or passive to the phototropic reaction. It has been discovered that if such photochromic materials are incorporated in a resinous material and the resinous material is then sandwiched between two sheets of glass the resultant photochromic filter exhibits superior performance as well as superior life.

It has been found that the major cause of breakdown in the photochromic compounds is the combined exposure to activating radiation, such as ultraviolet light, and atmospheric oxygen. The laminated systems of the instant invention provide for the exclusion of oxygen by the glass which acts as a barrier, and at the same time the glass serves as a filter to materially reduce the exposure to ultraviolet light. It is preferred to seal the edges of the laminated system with a sealing compound which provides both an oxygen and a moisture-vapor barrier along its marginal edges. Where the photochromic substances are sensitive to the visible portion of the spectrum, an ultraviolet absorber may be incorporated in the system to enhance the stability of the photochromic material without adversely affecting its performance.

DESCRIPTION OF THE PREFERRED EMBODIMENTS

Figure 1:
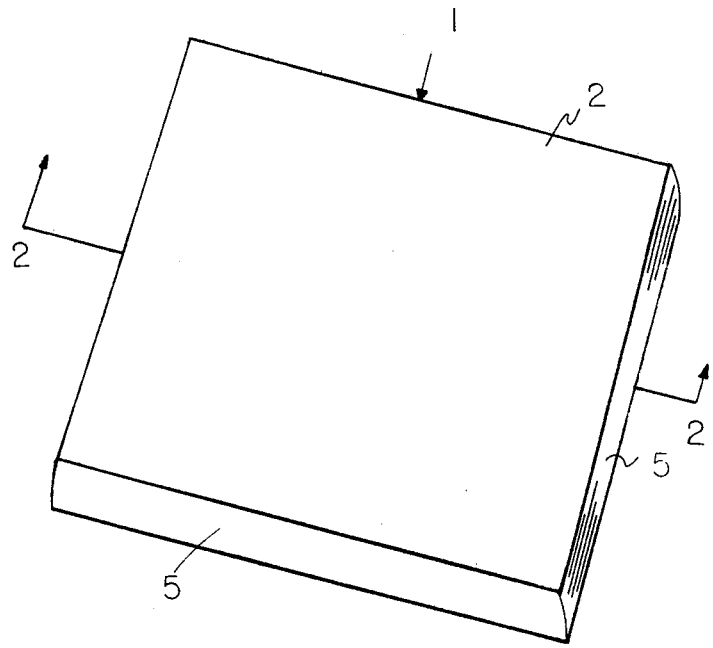
FIGURE 1 is a perspective view of a photochromic filter formed in accordance with the invention.
Figure 2:
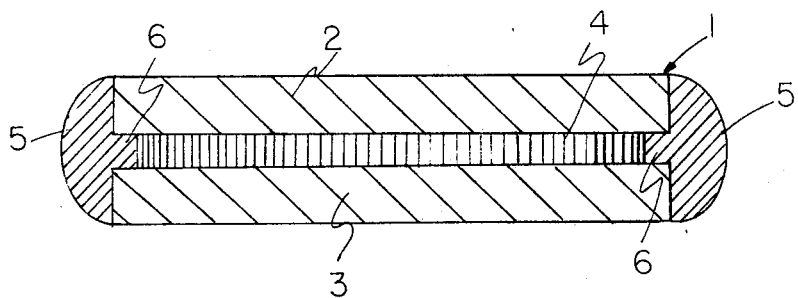
FIGURE 2 is a vertical sectional view taken along the line 2—2 of FIGURE 1.

Referring first to the drawings, the reference numeral 1 indicates a photochromic system in the form of a filter produced in accordance with the invention. The system comprises opposing sheets of glass 2 and 3 laminated together by means of a layer of resinous material 4 in which a photochromic material has been dissolved. The peripheral edges of the laminated structure are sealed by means of a polar type sealing type compound 5. Preferably, the layer 4 will terminate short of the edges of the glass plates 2 and 3 so as to provide a peripheral void 6 between the marginal edges of the plates 2 and 3 which will be filled by the sealing compound 5 to insure a tight seal.

The photochromic materials which have produced the most satisfactory results are mercury dithizonate and the spiropyrans. The former is sensitive to the visible portion of the spectrum and hence may be combined with an ultraviolet absorber to enhance its stability, whereas the spiropyrans are dependent upon ultraviolet light for activation and hence must be used without an ultraviolet absorber.

Polyvinyl butyral resin has been found to be a highly suitable vehicle for the photochromic substances, although other thermoplastic and thermosetting resins may be employed. In choosing a suitable resin, it must of course be a solvent for the photochromic substance being dissolved and it should not be subject to breakdown by irradiation. In addition, the resin must be capable of bonding to glass.

Numerous sealing compounds may be employed to seal the edges between the glass plates. Silicone compounds are preferred, particularly compounds which will vulcanize on being heated at relatively low temperatures. The sealing compound must also be resistant to oxidation.

Laminated systems in accordance with the invention may be formed as follows.

Example 1

A laminate is prepared by first coating one piece of glass with the photochromic substance, in this instance mercury dithizonate. A sheet of 0.015 inch thick polyvinyl butyral plastic film is placed over the photochromic coating. The second piece of glass is placed on top of the plastic film, whereupon the composite structure so formed is cured in an autoclave at a temperature of 275° F. at a pressure of about 150 pounds per square inch which serves to effectively develop adhesion of the resin to the glass. Under these processing conditions, the phototropic compound dissolves into the resin so that the resultant inner layer 4 is a true solution.

If the edges of the laminate are to be sealed with a vulcanizable silicone, the sealing compound is applied prior to the processing of the laminate in the autoclave. Alternatively, the sealing compound may be applied after curing of the laminate.

Example 2

A solution is first prepared in the following proportions:

400 milliliters of toluene
1 gram of mercury dithizonate
1.6 grams of ultraviolet absorber, such as Uvinul 490, which is a highly purified substituted benzophenone.

The plastic film (polyvinyl butyral resin) is immersed in this solution for a brief period of time, removed and allowed to dry. The toluene does not dissolve the plastic film, but it does swell the film sufficiently to permit penetration of the photochromic compound into the film. Upon drying, either in air or in a drying oven at about 150° F. for about one hour, the plastic film is then placed between the glass sheets and cured in the manner set forth in Example 1.

Example 3

A solution if first prepared in the following proportions:
100 grams of toluene
0.3 gram of spiropyran [1,3,3-trimethyl-6'-nitro-spiro-(2' H-1'-benzopyran-2,2'-indoline)].

The plastic film is immersed in this solution for a short time and then allowed to dry, whereupon the impregnated film is processed in accordance with Example 2. Since the spiropyran is essentially responsive to the ultraviolet portion of the spectrum, the use of an ultraviolet absorber is omitted since, if present, it would adversely affect the phototropic response of the spiropyran.

While the spiropyran set forth in Example 3 has been found to be particularly suitable due to its high degree of response, the other spiropyrans also may be employed.

The present invention will find utility with any photochromic substance which is soluble in a resin having the properties which have been enumerated. While a preference has been expressed for transparent glass as a covering and support medium for the resinous layer, it is also within the spirit of the invention to use other transparent materials, such as rigid or semi-rigid plastic sheets, which are compatible with the resinous carrier for the photochromic substance.

The embodiments of the invention in which an exclusive property or privilege is claimed are defined as follows:

1. A stabilized photochromic system comprising a pair of transparent glass sheets adhesively secured together by means of a resinous layer containing a dissolved normally unstable photochromic material, the edges of said sheets being sealed together by a sealing compound acting to provide an oxygen and a moisture-vapor barrier covering and sealing the edges of said resinous layer.

2. The photochromic system claimed in claim 1 wherein said resinous layer incorporates an ultraviolet absorber.

3. The photochromic system claimed in claim 1 wherein said photochromic material is mercury dithizonate.

4. The photochromic system claimed in claim 3 wherein said resinous layer also contains a dissolved ultraviolet absorbing material.

5. The photochromic system claimed in claim 1 wherein said photochromic material is a spiropyran.

6. A method of producing a stable photochromic system which comprises the steps of dissolving a normally unstable photochromic material in a resinous coating and utilizing said coating to bond together two sheets of transparent glass, the glass sheets forming a protective barrier for said resinous layer, including the step of sealing the edges of said glass sheets with a sealing compound to form an oxygen and a moisture-vapor barrier covering the edges of said resinous coating.

7. The method claimed in claim 6 including the steps of forming said resinous coating by applying the photochromic material to a film of resinous material, sandwiching said film between said glass sheets and thereafter heat treating said sandwich under pressure to dissolve said photochromic substance in said resinous film.

8. The method claimed in claim 7 wherein said sandwich is heat treated in an autoclave at a temperature of about 275° F. and at a pressure of about 150 pounds per square inch.

9. The method claimed in claim 6 including the steps of forming said resinous coating by dissolving the photochromic material in a solvent, dipping a film of resinous material into the solution so formed, drying the dipped film, sandwiching the dried film between said glass sheets and thereafter heat treating said sandwich under pressure to cause said film to adhere to said glass sheets.

10. The method claimed in claim 9 including the step of adding an ultraviolet absorber to said solution.

References Cited

UNITED STATES PATENTS

| 2,710,274 | 6/1955 | Kuehl | 154—2.77 |
| 3,322,542 | 5/1967 | Ullman et al. | 96—90 |
| 3,407,145 | 10/1968 | Brule | 350—160 X |

RONALD L. WIBERT, Primary Examiner

P. K. GODWIN, Jr., Assistant Examiner

U.S. Cl. X.R.

65—36; 161—192